United States Patent [19]
Steele et al.

[11] Patent Number: 5,332,065
[45] Date of Patent: Jul. 26, 1994

[54] INTEGRAL ABS EXCITER RING FOR CAST IRON HUB

[75] Inventors: David R. Steele, Farmington Hills; Thomas Stimson, Commerce Township, Oakland County, both of Mich.

[73] Assignee: The Budd Company, Troy, Mich.

[21] Appl. No.: 125,010

[22] Filed: Sep. 21, 1993

Related U.S. Application Data

[63] Continuation of Ser. No. 14,088, Feb. 4, 1993, abandoned, which is a continuation of Ser. No. 682,098, Apr. 5, 1991, abandoned.

[51] Int. Cl.$^5$ ................................................ B60T 8/60
[52] U.S. Cl. ........................ 188/18 R; 188/218 R; 303/91
[58] Field of Search .................. 164/111–113; 188/17, 18 A, 18 R, 181 A, 181 R, 218 R, 218 X; 303/91

[56] References Cited

U.S. PATENT DOCUMENTS

| | | | |
|---|---|---|---|
| 106,265 | 8/1870 | Hawley | 164/112 X |
| 1,895,533 | 1/1933 | Bagley | 164/111 |
| 3,069,209 | 12/1962 | Bauer | 164/111 X |
| 3,216,105 | 11/1965 | Gollwitzer | 164/111 X |
| 3,307,423 | 3/1967 | Dansi | 164/111 X |
| 3,626,226 | 12/1971 | Pauwels et al. | 188/181 A X |
| 3,651,901 | 3/1972 | Burckhardt et al. | 188/181 A |
| 3,793,545 | 2/1974 | Leiber et al. | 310/168 |
| 3,848,147 | 11/1974 | Anselmino | 188/181 R X |
| 4,061,213 | 12/1977 | Davy | 188/218 XK X |
| 4,758,053 | 7/1988 | Yasuno | 303/91 |
| 5,067,597 | 11/1991 | Young | 188/181 R |

FOREIGN PATENT DOCUMENTS 873012 7/1961 United Kingdom ............... 164/111

Primary Examiner—Robert J. Oberleitner
Assistant Examiner—Alfred Muratori
Attorney, Agent, or Firm—Harness, Dickey & Pierce

[57] ABSTRACT

An integral hub and exciter ring is disclosed for a motor vehicle equipped with an anti-lock braking system in which the exciter ring is integrally formed with the hub by machining grooves into the hub forming spaced teeth about the circumference of the hub. To improve the magnetic permeability of the teeth as compared to the cast iron of the hub, a steel band is insert cast into the hub resulting in a steel band having improved magnetic permeability and also being molecularly bonded to the cast iron to ensure retention of the band in the hub.

6 Claims, 2 Drawing Sheets

INTEGRAL ABS EXCITER RING FOR CAST IRON HUB

This is a continuation of application Ser. No. 08/014,088, filed Feb. 4, 1993 and entitled "Integral ABS Exciter Ring For Cast Iron Hub, now abandoned, which was a continuation of U.S. patent application Ser. No. 07/682,098, filed Apr. 5, 1991 and entitled "Integral ABS Exciter Ring for Cast Iron Hub, now abandoned.

BACKGROUND AND SUMMARY OF THE INVENTION

This invention relates to a motor vehicle hub for a vehicle having an anti-lock braking system and in particular to a cast iron hub with an integral exciter ring.

In recent years, anti-lock braking systems (ABS) are being found on an increasing number of passenger motor vehicles. The ABS detects wheel rotation and acts to relieve braking force applied to the vehicle's wheels to prevent a lock-up condition from occurring. Wheel brake locking is undesirable since it can result in longer stopping distances and directional instability of the vehicle. The most advanced ABS designs employ a sensor at each wheel subject to ABS control. The sensors detect wheel rotation using various technologies including variable reluctance sensors and inductive pickups. Signals from the wheel rotation sensors are fed into an ABS computer which modulates the braking force.

The variable reluctance sensors and inductive pickup sensors typically use some type of tone wheel or exciter ring that rotates relative to the sensor in response to wheel rotation. Hereinafter, the term "exciter ring" will be used to refer to any such member, the rotation of which is detected by the sensors. One common form of a exciter ring is a cylindrical ring formed by a strap of steel or other material that is perforated to form a plurality of axially aligned slots through the strap. The strap is bent to form a ring with the two ends butt welded together and is press fit over a cylindrical surface of the wheel hub to rotate therewith. The sensor is mounted to a non-rotating component of the vehicle's suspension and spaced from the exciter ring.

There are, however, several problems associated with such an exciter ring. It is necessary to maintain a precise clearance between the sensor and the exciter ring on the order of 0.030-0.050 inches. If this dimension is not precisely maintained, the sensor, and hence the ABS, will not function as intended. With a press fit exciter ring on the hub there is a dimensional stack-up resulting in a radial run out and variability in the clearance between the exciter ring and the sensor. Another problem is that the hoop stresses formed in the exciter ring as a result of being press fit onto the hub can cause a failure of the butt weld and subsequent loss of the exciter ring. A further problem is created by corrosion of the exciter ring and/or the hub that results in the exciter ring separating from the hub. The first problem can result in improper functioning of the ABS while the second and third problems result in a total failure of the ABS.

Accordingly, it is an objective of the present invention to provide a hub and exciter ring assembly that overcomes the above problems.

The present invention overcomes the above problems by integrally forming the exciter ring as a part of the hub itself, rather than forming the exciter ring of a separate component press fit to the hub. One way to integrally form the hub and exciter ring is to machine the exciter ring into the hub. However, the magnetic permeability of the cast iron may not be sufficient for proper functioning of the sensor. To provide a magnetic permeability greater than that possible with the cast iron hub, a steel ring is first bonded to the hub by insert casting the ring into the hub. After casting, the hub is machined to expose the ring at the surface of the hub and the ring itself is machined to provide a uniform surface at the propoet location for producing the necessary clearance between the hub surface and sensor. Grooves are subsequently machined into the ring to form spaced teeth therebetween.

By insert casting of the steel band into the hub, the steel band is molecularly bonded to the cast iron. As a result, there is no butt weld necessary to maintain the steel band on the hub, nor is there a possibility of corrosion between the two materials that would result in the loosening of the band. Furthermore, by machining a cylindrical surface after casting, close tolerance and the roundness of the exciter ring can be ensured, resulting in a more precise clearance between the sensor and the exciter ring.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE PREFERRED EMBODIMENT

Figure 1:
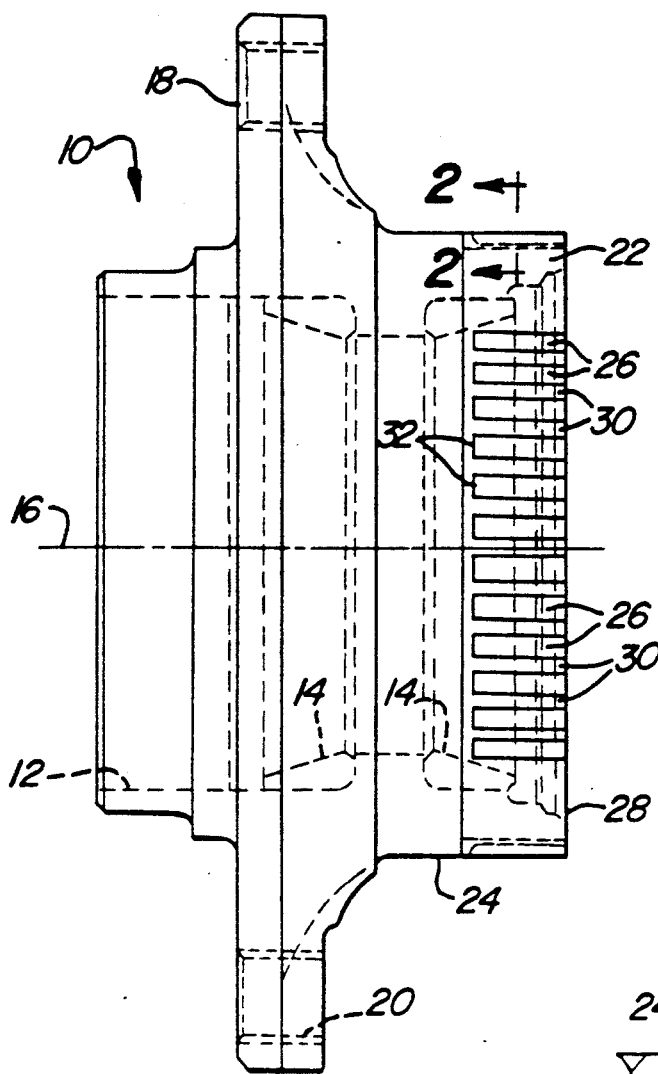
FIG. 1 is an elevational view of the hub and integral exciter ring of the present invention.

The hub with an integral exciter ring of the present invention is designated generally at 10 in FIG. 1. The hub 10 forms an interior passage 12 shaped to receive one or more bearing cups 14 for use in rotatably mounting the hub and integral exciter ring to a spindle or other suspension component of a motor vehicle. The hub is mounted for rotation about the hub axis 16. The hub and exciter ring further includes a radial flange 18 having apertures 20 therethrough for receiving a wheel lug for mounting of a wheel and tire assembly to the hub 10 and exciter ring.

The hub and exciter ring is formed of cast iron with a steel band 22 insert cast into the molten iron. The insert casting of the steel band 22 into the hub results in a molecular bonding of the cast iron molecules with the steel molecules to retain the steel band in place. As a result, there are no hoop stresses in the band as compared to the exciter rings of the prior art. Accordingly, there are no butt welds required to hold the band 22 in place.

After the surface of the interior passage 12 has been machined into the hub, the surface of the hub is machined to expose the steel band and to machine the band itself to the proper dimension to produce the desired clearance between the band and the ABS sensor. In the embodiment shown in FIG. 1, the steel band 22 forms an outer cylindrical surface 24. By machining the surface 24, the roundness and concentricity of the steel band is ensured and the radial surface of the band 22 is coincidental with the cylindrical surface 24 of the hub 10.

Figure 2:
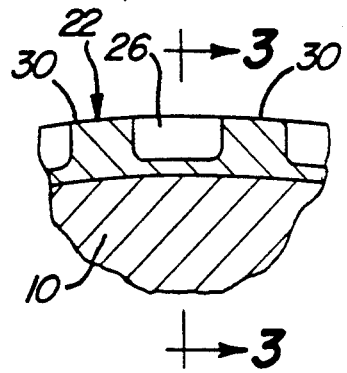
FIG. 2 is a sectional view as seen from substantially the line 2—2 of FIG. 1.
Figure 3:
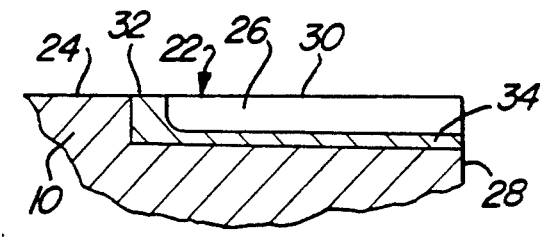
FIG. 3 is a sectional view as seen from substantially the line 3—3 of FIG. 2.

After machining the surface 24, a plurality of axial grooves 26 are machined into the steel band 22 to form a plurality of teeth 30 between the grooves 26 creating the exciter ring. Some of the grooves 26 have been omitted from FIG. 1 for purposes of clarity. As seen in FIGS. 1-3, the radial surfaces of the teeth 30 are coincidental with the cylindrical surface 24 of the hub 10. The grooves 26 do not extend through the entire width of the band 22 to create a land 32 at one lengthwise end of the teeth 30 to connect the teeth to one another. This provides a magnetic flux path from one tooth to another.

The depth of the grooves 26 is slightly less than the thickness of the band 22 to provide a base 34 in each groove that also connects the teeth 30. This also provides a magnetic flux path. Another benefit of the groove base 34 being part of the band 22 is that the bond of the band 22 to the cast iron is not disturbed. Either one or both of the land 32 and base 34 are needed to provide a flux path.

The molecular bonding of the steel band with the cast iron prevents the introduction of any corrosive materials into the interface between the band and the cast iron that could result in the loosening and subsequent separation of the band. Furthermore, by machining the surface of the band subsequent to the insert casting, the clearance between the sensor and the exciter ring can be more precisely controlled. As a result, the hub 10 with an integral exciter ring of the present invention meets the objective of the present invention by overcoming the noted problems of the prior art pressed on exciter rings.

Figure 4:
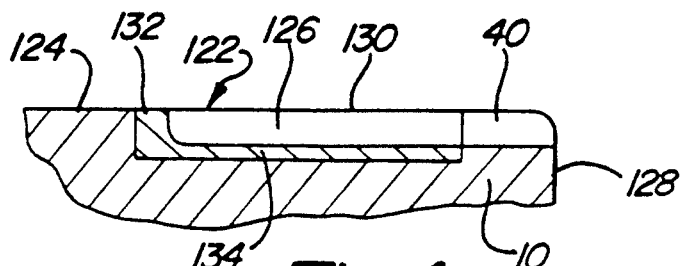
FIG. 4 is a sectional view similar to FIG. 3 illustrating an alternative embodiment of the present invention.

An alternative embodiment of the present invention is shown in FIG. 4 in which elements similar to those found in FIGS. 1, 2, and 3 are given the same reference number with the addition of 100. In this alternative embodiment, the ring 122 is spaced axially from the end of the hub 128. As a result, a radially extending lip 140 is formed by the cast iron so that the ring is axially captured within the hub. This can provide an additional assurance of retention of the steel band 122 to the hub.

Figure 5:
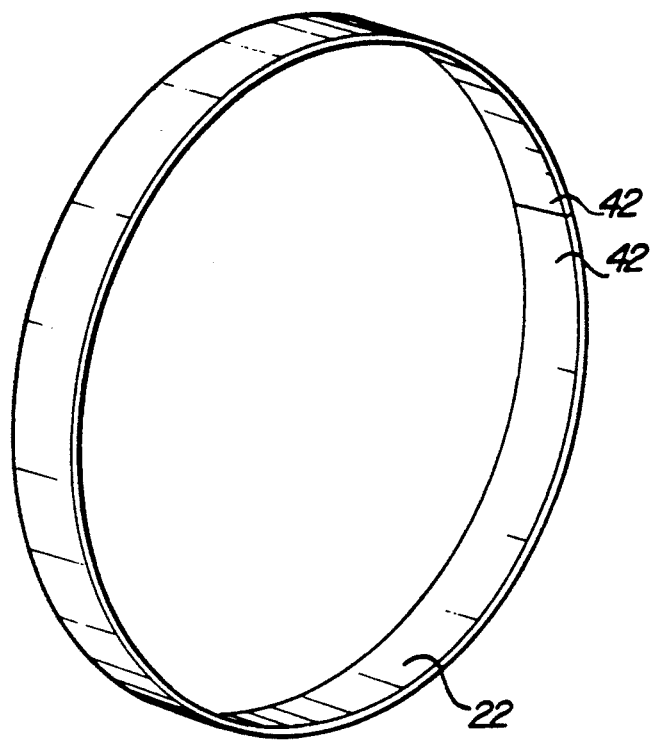
FIG. 5 is a perspective view of the steel band to be insert cast in the hub shown in FIG. 1.
Figure 6:
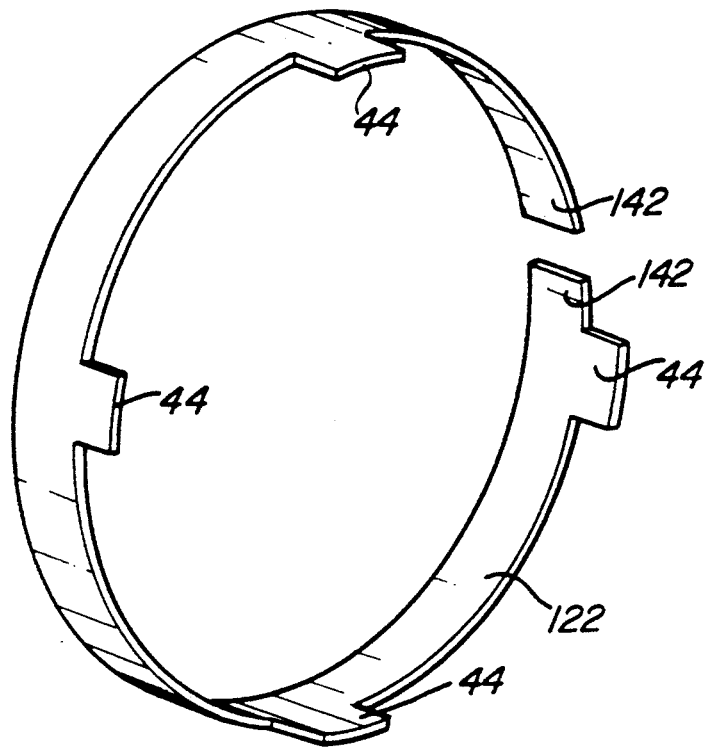
FIG. 6 is a perspective view of the steel band for use in the alternative embodiment shown in FIG. 4.

The steel band 22 is shown in FIG. 5 and is formed by bending a flat strip of steel into a circle forming a cylinder. The ends 42 of the steel strip are butted against one another and can be welded if desired. The band 22 can be inserted into a sand casting mold by deflecting one end 42 radially inwardly of the opposite end and radially compressing the band 22 until it is placed in the desired position. The band is then released and allowed to expand radially to its nominal size. If desired, the band can be formed into a cylinder of a radius slightly larger than desired such that once placed in the mold, the band tends to expand radially outward against the mold wall to provide a retention force to hold the band in place as shown by the alternative band 122 of FIG. 6.

Band 122 is formed with a plurality of axially extending tabs or legs 44. The tabs 44 are used to space the band 122 from the end of the mold cavity to position the band as desired from the axial end of the hub. When the hub is cast, the molten metal will flow around both axial ends of the band to axially encapture the band. The band 122 is bent into a cylinder having a circumference larger than the length of the steel strip such that the ends 46 of the band are circumferentially spaced.

While the above description constitutes the preferred embodiments of the present invention, it will be appreciated that the invention is susceptible to modification, variation and change without departing form the proper scope and fair meaning of the accompanying claims.

What is claimed is:

1. An integral hub and exciter ring assembly for a motor vehicle having an anti-lock braking system comprising:
   a cast iron hub having means for affixing a wheel to said hub and means for rotatably mounting said hub to a suspension structure of a motor vehicle, said hub defining an exterior substantially cylindrical surface;
   a ring bonded to said cast iron hub and being of a material having a magnetic permeability greater than cast iron, said ring including a surface coincidental with said substantially cylindrical surface of said hub; and
   spaced teeth formed in said ring, said teeth including a radial surface coincidental with said substantially cylindrical surface of said hub, said teeth formed by grooves in said ring between said teeth, said teeth joined to one another by a base portion of said ring extending between said teeth at said grooves.

2. The integral hub and exciter ring assembly of claim 1 wherein said ring is made of steel.

3. The integral hub and exciter ring assembly of claim 1 wherein said teeth are joined to one another by a portion of said ring remaining at one lengthwise end of said teeth.

4. The integral hub and exciter ring of claim 1 wherein said ring forms a cylindrical outer surface of said hub with said teeth and grooves extending axially.

5. The integral hub and exciter ring assembly of claim 4 wherein said ring is disposed at one axial end of said cast iron hub.

6. The integral hub and exciter ring assembly of claim 4 wherein said ring is spaced axially from one axial end of said cast iron hub with said cast iron hub forming a radially extending lip to axially entrap said ring.

* * * * *